United States Patent
Morita et al.

(10) Patent No.: US 9,476,726 B2
(45) Date of Patent: Oct. 25, 2016

(54) NAVIGATION APPARATUS AND NAVIGATION METHOD

(75) Inventors: Hiroyuki Morita, Saitama (JP); Shinichi Kawada, Niigata (JP); Eiichi Murohashi, Niigata (JP)

(73) Assignees: NIPPON SEIKI CO., LTD., Niigata (JP); HONDA GIKEN KOGYO CO., LTD., Tokyo (JP)

( * ) Notice: Subject to any disclaimer, the term of this patent is extended or adjusted under 35 U.S.C. 154(b) by 1568 days.

(21) Appl. No.: 10/486,787

(22) PCT Filed: Feb. 24, 2003

(86) PCT No.: PCT/JP03/02003
§ 371 (c)(1),
(2), (4) Date: Feb. 13, 2004

(87) PCT Pub. No.: WO03/074971
PCT Pub. Date: Sep. 12, 2003

(65) Prior Publication Data
US 2005/0004746 A1    Jan. 6, 2005

(30) Foreign Application Priority Data
Mar. 1, 2002   (JP) .................................. 2002-55116

(51) Int. Cl.
*G01C 21/00*   (2006.01)
*G08B 1/00*    (2006.01)
(Continued)

(52) U.S. Cl.
CPC .............. *G01C 21/36* (2013.01); *G01C 21/34* (2013.01); *G08G 1/127* (2013.01); *G08G 1/0969* (2013.01)

(58) Field of Classification Search
USPC ....... 701/209, 202, 207, 210, 213, 217, 400, 701/408, 409, 410, 420, 425, 426, 428, 430, 701/431, 438, 461, 468, 487, 467; 340/990, 340/995, 431, 439.1, 539.11, 539.13, 340/539.17, 539.16, 539.2; 342/357.13, 342/357.1, 357.14, 357.06, 357.2, 357.21, 342/352, 357.22, 357.25
See application file for complete search history.

(56) References Cited

U.S. PATENT DOCUMENTS 4,890,133 A * 12/1989 Ogawa et al. .................. 396/93
4,924,402 A *  5/1990 Ando et al. ................... 701/208
(Continued)

FOREIGN PATENT DOCUMENTS

JP         9-145394       6/1997
JP         10-20776       1/1998
(Continued)

*Primary Examiner* — Ronnie Mancho
(74) *Attorney, Agent, or Firm* — McDermott Will & Emery LLP

(57) ABSTRACT

A navigation device 10 comprises: position detecting means 11 for determining the current position of a user from the absolute position in longitude and latitude by using the electric waves coming from a plurality of artificial satellites going around the earth; storage means 14 for storing the coordinates in longitude and latitude of nodes, as obtained by setting a starting point and a final place, on a scheduled route; display means 12 for displaying the current position and the scheduled route; and control means 16 for controlling the display on the display means 12 by converting the angular data of the absolute positions and the coordinates into distance data while making corrections according to the current position, and by calculating an element between the nodes thereby to calculate whether or not the current position is on the scheduled route, in dependence upon whether or not the distance between the element and the current position is within a predetermined range.

3 Claims, 3 Drawing Sheets

(51) Int. Cl.
  *G01S 19/42* (2010.01)
  *G01C 21/36* (2006.01)
  *G01C 21/34* (2006.01)
  *G08G 1/127* (2006.01)
  *G08G 1/0969* (2006.01)

(56) References Cited

U.S. PATENT DOCUMENTS

| | | | |
|---|---|---|---|
| 5,774,824 A * | 6/1998 | Streit et al. | 701/207 |
| 5,991,688 A * | 11/1999 | Fukushima et al. | 701/209 |
| 6,246,932 B1 * | 6/2001 | Kageyama et al. | 701/24 |
| 6,622,090 B2 * | 9/2003 | Lin | 701/213 |
| 6,680,694 B1 * | 1/2004 | Knockeart et al. | 342/357.09 |
| 2002/0072849 A1 * | 6/2002 | Endo et al. | 701/211 |

FOREIGN PATENT DOCUMENTS

| | | |
|---|---|---|
| JP | 10-47986 | 2/1998 |
| JP | 11-14378 | 1/1999 |
| JP | 11-142167 | 5/1999 |
| JP | 11-304532 | 11/1999 |
| JP | 2001-76289 A | 3/2001 |
| JP | 2001-264095 A | 9/2001 |
| JP | 2002-22480 A | 1/2002 |
| JP | 2002-351307 A | 12/2002 |

* cited by examiner

NAVIGATION APPARATUS AND NAVIGATION METHOD

TECHNICAL FIELD

The present invention relates to a navigation device and a navigation method to be used for guiding a moving body such as a human being or a vehicle.

BACKGROUND ART

The navigation device to be mounted on an automobile or a two-wheeled vehicle, for example, is constructed to include: position detecting means such as a GPS (Global Positioning System) for determining the current position of the user of the vehicle by using the electric waves coming from a plurality of artificial satellites going around the earth; reproduction means for reproducing storage medium such as the CD-ROM stored with map data and accessory data associated therewith (e.g., display data to be displayed together with the map data such as place names or road names, or non-display data not to be displayed together with the map data, such as coordinates of nodes such as the intersections on roads or the points having made turns at predetermined angles (in degrees) or the distance or the like of an element indicating the segment between the nodes) associated with the map data; and control means such as a microcomputer for controlling those means. On the basis of the current position specified by the position detecting means, the reproduction means reads the map data, as stored in the storage medium, of the corresponding area, and the current position or the like is displayed by display means such as a liquid crystal display element (as referred to JP-A-10-20776 and JP-A-11-14378, for example).

In another navigation device practiced, alternatively, by operating input means such as a remote-control or touch-panel type switch to set a starting place and a final place (including a routed place on the route), the control means searches a scheduled route from the map data or the like of its surrounding place, and the user is guided by using the display means on the basis of the scheduled route and the current position.

This navigation device has to be mounted on the vehicle in its entirety including the position detecting means, the reproduction means (containing the storage medium), the control means, the display means and the input means, so that the system construction is large-sized to raise a problem in the retention of the mounting space.

For the guidance, on the other hand, there is known a navigation device (as referred to JP-A-9-145394), in which the precision is enhanced by using the absolute position obtained by the GPS in longitude and latitude, together with the relative position determined by an self-contained navigation for measuring the movements from a reference point (e.g., the starting point) by accumulating them with a distance sensor and a direction sensor, because it is difficult for the position detecting means to determine the current position precisely merely with the GPS.

This navigation device can have an enhanced location precision but is troubled by a problem that the operations of the absolute position and the relative position are complicated.

There is also known a navigation device, in which the number of branches of routes, the branching directions and the positional information (in latitude, longitude and altitude) are stored as the map information in a flash memory to display those branching situations and the straight lines joining the individual branches in distance and direction, so as to retain the portability and to reduce the capacity of storage for the map information (as referred to JP-A-2002-22480, for example).

In this navigation device, the storage capacity is reduced, but the angular data in the longitude and latitude are used. Therefore, it seems that a difference appears in the distance data which are needed when the relations between the current position and the branches are measured and displayed. This is caused the earth has a spherical shape so that the point distance becomes different even for an equal angular difference.

The present invention has been conceived in view of those problems and has an object to provide a navigation device and a navigation method, which can reduce the size of the system construction and can improve the precision while simplifying the operations.

DISCLOSURE OF THE INVENTION

The navigation device of the present invention for solving the aforementioned problems comprises: position detecting means for determining the current position of a user from the absolute position in longitude and latitude by using the electric waves coming from a plurality of artificial satellites going around the earth; storage means for storing the coordinates in the longitude and latitude of a starting place and a final place, and the coordinates in the longitude and latitude of nodes, as obtained by setting the starting point and the final place, on a scheduled route; display means for displaying the current position and the scheduled route; and control means for controlling the display on the display means by converting the angular data of the absolute positions and the coordinates into distance data while making corrections according to the current position, and by calculating an element between the nodes thereby to calculate whether or not the current position is on the scheduled route, in dependence upon whether or not the distance between the element and the current position is within a predetermined range.

The navigation device comprises: position detecting means for determining the current position of a user from the absolute position in longitude and latitude by using the electric waves coming from a plurality of artificial satellites going around the earth; storage means for storing the coordinates in the longitude and latitude of a starting place and a final place, and the coordinates in the longitude and latitude of nodes, as obtained by setting the starting point and the final place, on a scheduled route; display means for displaying the current position and the scheduled route; control means for controlling the display on the display means by converting the angular data of the absolute positions and the coordinates into distance data while making corrections according to the current position, and by calculating an element between the nodes thereby to calculate whether or not the current position is on the scheduled route, in dependence upon whether or not the distance between the element and the current position is within a predetermined range; and interface means for interchanging data with an external auxiliary device for searching the scheduled route.

The navigation device need not be provided with the storage medium or the reproduction means for reproducing the former, so that its system construction can be made small and can be properly used in the space-limited situation as in a mobile type device or a device for a two-wheeled vehicle. Moreover, the navigation device calculates the on-route state and the off-route state by using only the coordinates (or the node data) of the nodes on the preset scheduled route, so that it can simplify the operations for the system construction which needs not any high-performance microcomputer as the control means of the navigation device. Moreover, the navigation device needs only the node data to be stored as the numerical data so that it does not need the storage means of a large capacity for storing the image data. Moreover, the navigation device can store massive nodes such as the scheduled route of a long distance or a plurality of scheduled routes so that it can enhance the usability of the navigation device suitably. Moreover, the on-route state or the off-route state is calculated by converting the angular data into the distance data while correcting them at the point, so that the precision of the navigation device can be properly improved.

In the navigation method of the present invention for solving the aforementioned problems: in that at least one scheduled route is determined by setting a starting place and a final place, before used, with an external auxiliary device thereby to search the scheduled route; in that the coordinates in longitude and latitude of the starting place and the final place and the coordinates in longitude and latitude of nodes on the scheduled route are stored in storage means of the navigation device through interface means; in that the absolute position in longitude and latitude of the current position of a user by using electric waves coming from a plurality of artificial satellites going around the earth with position detecting means; in that the angular data of the absolute position and the coordinates while making corrections according to the current position are converted into distance data, and in that an element between the nodes is determined by calculations; in that whether or not the current position is on the scheduled route is calculated depending on whether or not the distance between the element and the current position is within a predetermined range; and in that the current position and the scheduled route are displayed by display means in accordance with the calculation results.

The predetermined range is made so different in values between the cases, in which the current position is approaching and leaving the scheduled route that the former value is smaller than the latter value.

The route can be planned, before used, for a sufficient long time, and a great number of nodes such as the scheduled route of a long range and a plurality of scheduled routes. The navigation method is proper for enhancing the conveniences of the navigation device. Especially, the predetermined range is made so different between the cases in which the current position is approaching and leaving the scheduled route, that the former value is smaller than the latter value. Therefore, the display of the unnecessary off-route in the display means due to the precision failure, as might otherwise be caused by using the GPS receiver as the position detecting means, can be prevented to enhance the visibility properly.

BEST MODE CARRYING OUT THE INVENTION

The present invention will be described in connection with an embodiment shown in the accompanying drawings.

Figure 1:
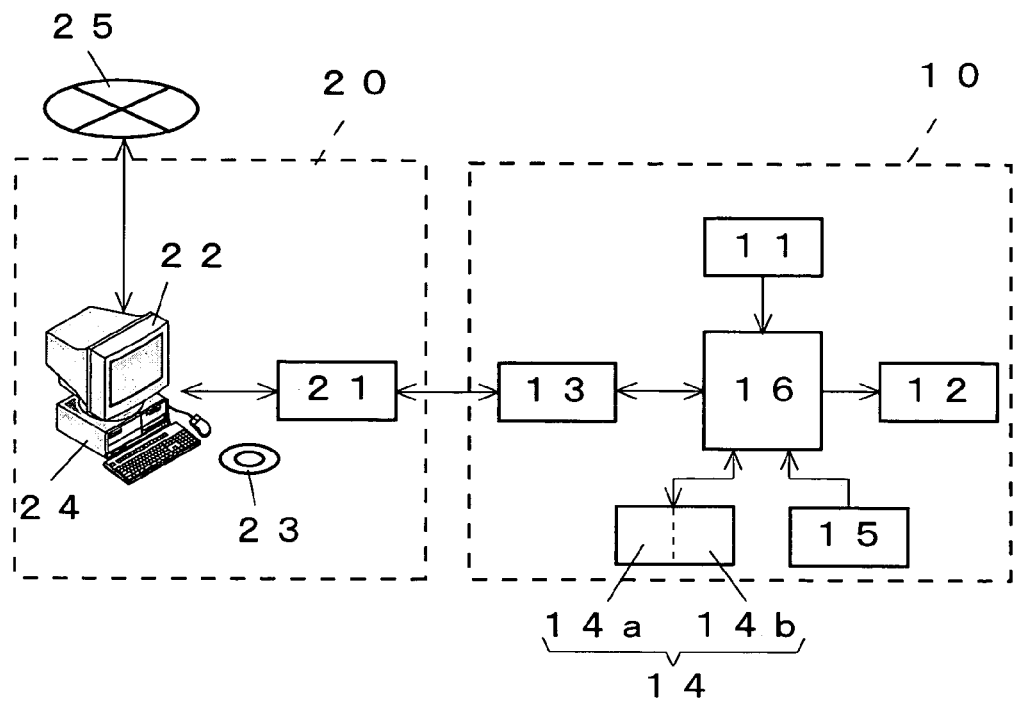
FIG. 1 is a block diagram for explaining a construction of a navigation device.

FIG. 1 is a block diagram for explaining a construction of an embodiment of the invention. The navigation device 10 is constructed to include: position detecting means 11 made of a GPS receiver for determining the current position of a user with absolute longitude and latitude positions by using the electric waves from a plurality of artificial satellites going around the earth; display means 12 made of a liquid crystal element for displaying the current position and a course; interface means 13 for exchanging data with the outside through a wired transmission (e.g., LAN) or a wireless transmission (e.g., IrDA); storage means 14 made of a memory for storing the data; input means 15 made of a switch or the like to be used for changing the display mode at the display means 12; and control means 16 made of a microcomputer for controlling the entire system.

The storage means 14 is constructed to include a ROM 14a stored with programs or the like for the control means 16 to perform predetermined operations, and a RAM 14b for storing node data (as will be described hereinafter) on the scheduled route determined by an external auxiliary device 20.

This external auxiliary device 20 is connected with the navigation device 10 by connecting its interface means 21 and the interface means 13 of the navigation device 10. The external auxiliary device 20 is constructed to include: processing means 22 made of a personal computer or PDA for searching the scheduled route by setting a starting place and a final place (including a routed place on the route, as in the following); and reproduction means 24 for reproducing a storage medium 23 such as a CD-ROM, which is stored with map data for the searches and accessory data (e.g., display data such as place names or road names to be displayed together with the map data, or non-display data not to be displayed together with the map data, such as coordinates (or node data) of nodes such as the intersections on roads or the points having made turns at predetermined angles (in degrees) or the distance or the like of an element indicating the road between the nodes) associated with the map data. In FIG. 1: the processing means 22 is exemplified by a desktop personal computer; the storage medium 23 by the CD-ROM; and the reproduction means 24 by a CD-ROM drive unit. The processing means 22 and the reproduction means 24 are structurally integrated. Here, the elements may also be called as the "links" according to the business world.

Here, the means for acquiring the map data or the accessory data can use not only the storage medium 23 and the reproduction means 24 but also an internet 25.

Figure 3:
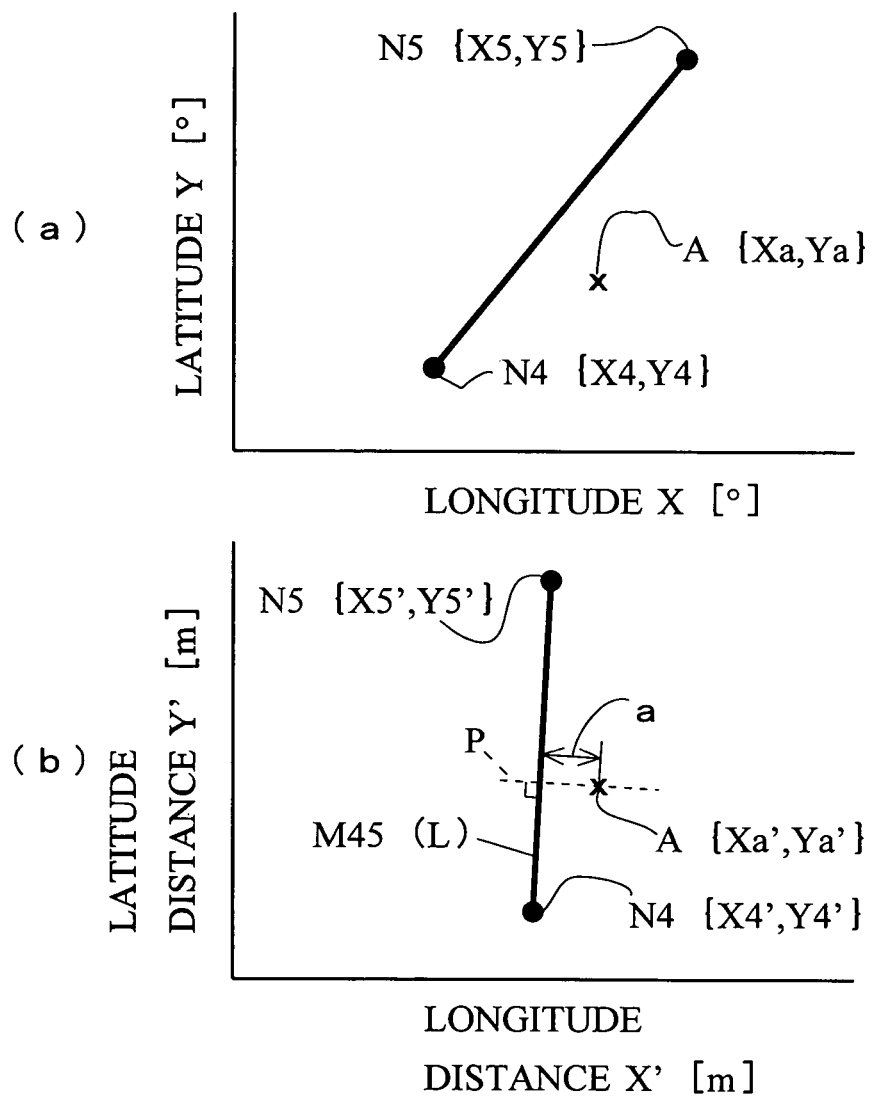
FIG. 3 presents explanatory diagrams of a current position in the navigation device.
Figure 4:
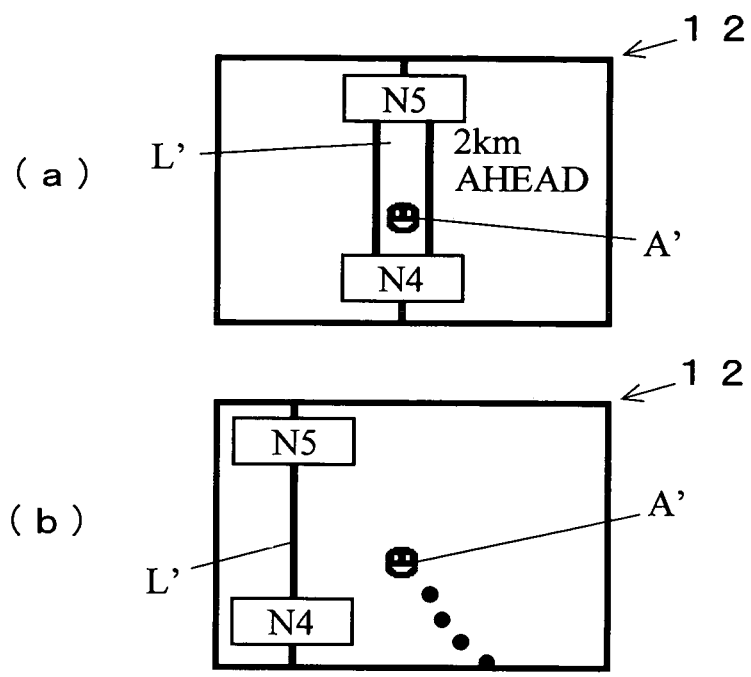
FIG. 4 presents explanatory diagrams of displays in the navigation device.

Here will be described a navigation method using the navigation device 10 with additional reference to FIG. 2 to FIG. 4.

Figure 2:
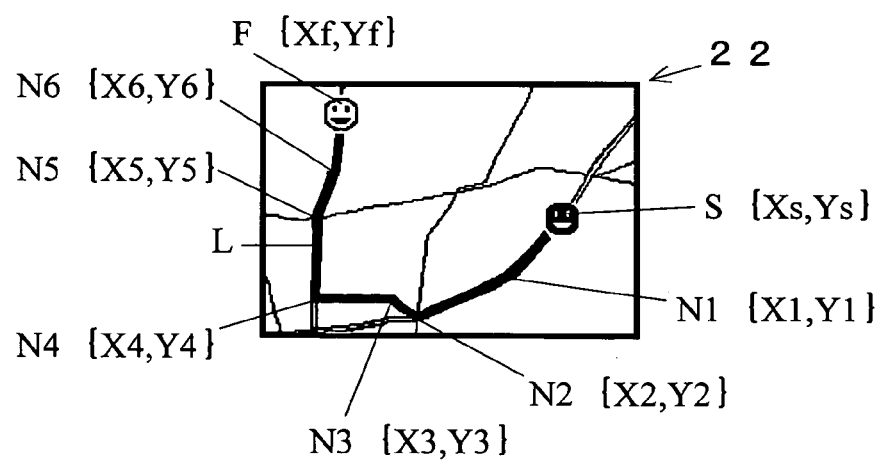
FIG. 2 is an explanatory diagram of a scheduled route in the navigation device.

The user of the navigation device 10 searches, before the use, the scheduled route by setting a staring place S and a final place F with the storage medium 23 and the reproduction means 24 of the external auxiliary device 20 and/or the internet 25, and determines and decides at least one scheduled route L (as referred to FIG. 2).

The external auxiliary device 20 determines either the coordinates (or point data B) of the starting place S (Start) and the finish point F (Finish) and the coordinates (or node data D) of nodes N of the intersections or the points having made turns at predetermined angles (in degrees) or more on the scheduled route L, and sends those point data B and the node data D to the navigation device 10 through the interface means 21. Then, the navigation device 10 stores the RAM 14b of the storage means 14 with the point data B and the node data D, that is, the portions of the accessory data received through the interface means 13.

In the following description, the contents of the point data B of the starting place S and the finish place F are longitudes and latitudes so that they are expressed in {Xs, Ys} and {Xf, Yf}. Likewise on the node data D, the contents of node data Dn of an arbitrary node Nn (n=1 to 6 in FIG. 2) are longitudes and latitudes so that they are expressed in {Xn, Yn}. Here, Xs, Xf and Xn are individual longitude values and Ys, Yf and Yn are individual latitude values so that the values {Xs, Ys}y {Xf, Yf} and {Xn, Yn} of the point data B and the node data Dn to be stored in the RAM 14b have a unit of "angle [degrees]".

Thus, before the driver rides on the vehicle and after at least one scheduled route L is determined with the external auxiliary device 20 by the calculations, the point data B and the node data D, that is, a portion of the additional data on the scheduled route L are transmitted to the storage means 14 of the navigation device 10, and only the navigation device 10 is mounted for use on the vehicle but the external auxiliary device 20 is not used.

In the navigation device 10, the control means 16 judges whether or not a present position A is on the scheduled route L, by performing predetermined calculations according to the programs stored in the ROM 14a of the storage means 14, and the display means 12 displays.

Specifically, the position detecting means 11 determines a node N4, for example, by determining the longitude and latitude values {Xa, Ya} or the absolute position of the current position A at every predetermined timings and by calculating the starting place S, the final place F and the Node Nn close to that absolute position. Of nodes N3 and N5 leading to the node N4, moreover, the node closer to the current position A is calculated to determine the node N5, for example (as referred to FIG. 3(a)).

Next, the values {Xa, Ya}, {X4, Y4} and {X5, Y5} of the current position A and the nodes N4 and N5 are converted from the angular data in the longitude and latitude into the distance data in the longitude distance and latitude distance. At this time, in view of the fact that the earth is a spherical shape and that the point distance is so different for an equal angular distance that the longitude distance becomes the shorter for the higher latitude, a correction is made according to the value {Xa, Ya} of the current position A to determine the values {Xa', Ya'}, {X4', Y4'} and {X5', Y5'} having a unit of "distance [m]" (as referred to FIG. 3(b)). Here, the coefficient (having the unit [m/degrees]) used for that correction is geographically known and are stored as parameters or a data table in the ROM 14a of the storage means 14, for example.

The RAM 14b of the storage means 14 is not stored with the accessory data on the elements. However, the section between the nodes Nn and Nn+1 can be deemed as a straight line so that an element M45 between the nodes N4 and N5 or a portion of the scheduled route L can be determined by calculations from the values {X4', Y4'} and {X5', Y5'}.

And, the element M45 and the value {Xa', Ya'} of the current position A are compared. If the distance a of a perpendicular P taken from the current position A to the element M45 is within a predetermined range (e.g., 20 m), the control means 16 calculates to judge the on-route state, in which the current position A is on the scheduled route L. If not, the control means 16 calculates to judge the off-route state, in which the current position A is off the scheduled route L. These calculation results are displayed on the display means 12. FIG. 4(a) shows a display example in the on-route state, and FIG. 4(b) shows a display example in the off-route state. In these Figures, letter A' designates a current position icon indicating the position of the current position A (as referred to FIG. 2 and FIG. 3), and letter L' designates a scheduled route image indicating a portion of the scheduled route L (as referred to FIG. 2 and FIG. 3) or the element M45 (as referred to FIG. 3) closest to the current position A. Moreover, the nodes N4 and N5 may or may not be displayed.

The display means 12 makes displays in the current position fixed display mode, in which the current position A is fixed at a predetermined position in the display means 12, the front wide display mode, in which the forward side in the traveling direction is displayed widely, and the aforementioned various modes in combination, such as a north-up display mode, in which the "north" in the azimuth is displayed upward, or a heading-up display mode, in which the advancing direction is displayed upward. These display modes can be suitably selected by operating the input means 15. FIGS. 4(a) and 4(b) show the display mode, in which the north-up display mode is combined with the current position fixed display mode.

From now on, the control means 16 controls the display means 12 in accordance with the aforementioned calculations based on the value from the position detecting means 11 and the value from the RAM 14b of the storage means 14.

Here, the aforementioned predetermined range may be given such a hysteresis as may take different values between the cases, in which the current position A is approaching and leaving the scheduled route L. By setting the former value smaller than the latter value, the frequency of causing the off-route can be suppressed so that the precision failure, as might otherwise be caused by using the GPS receiver as the position detecting means 11, disappears.

The navigation device need not be provided with the storage medium or the reproduction means for reproducing the former, so that its system construction can be made small and can be properly used in the space-limited situation as in a mobile type device or a device for a two-wheeled vehicle.

Moreover, the navigation device calculates the on-route state and the off-route state by using only the coordinates (or the node data) of the nodes on the preset scheduled route, so that it can simplify the operations for the system construction which needs not any high-performance microcomputer as the control means of the navigation device.

Moreover, the navigation device needs only the node data to be stored as the numerical data so that it does not need the storage means of a large capacity for storing the image data. Moreover, the navigation device can store massive nodes such as the scheduled route of a long distance or a plurality of scheduled routes so that it can enhance the usability of the navigation device suitably.

Moreover, the on-route state or the off-route state is calculated by converting the angular data into the distance data while correcting them at the point, so that the precision of the navigation device can be properly improved.

The route can be planned, before used, for a sufficient long time, and a great number of nodes such as the scheduled route of a long range and a plurality of scheduled routes. The navigation method is proper for enhancing the conveniences of the navigation device.

Especially, the predetermined range is made so different between the cases in which the current position is approaching and leaving the scheduled route, that the former value is smaller than the latter value. Therefore, the display of the unnecessary off-route in the display means due to the precision failure, as might otherwise be caused by using the GPS receiver as the position detecting means, can be prevented to enhance the visibility properly.

INDUSTRIAL APPLICABILITY

The present invention can be applied to the navigation device and is suited for the navigation device and the navigation method to be used for guiding a moving body such as a human being or a vehicle.

The invention claimed is:

1. A navigation device comprising:
   means for determining the current position of a user using an absolute position expressed as angular data in units of degrees longitude and degrees latitude by using the electric waves coming from a plurality of artificial satellites going around the earth;
   means for storing coordinates of longitude and latitude of a starting place and a final place, and coordinates of longitude and latitude of nodes, as obtained by setting said starting point and said final place, on a scheduled route, wherein the coordinates are stored as angular data in units of degrees longitude and degrees latitude;
   means for displaying said current position and said scheduled route;
   means for controlling the display of said means for displaying, by converting the angular data of said absolute positions and said coordinates into distance data while making corrections according to said current position, by calculating an element between said nodes to determine whether or not said current position is on said scheduled route, based on whether or not the distance between said element and said current position is within a predetermined range, and by changing a display on said means for displaying based on the calculation of whether or not the distance between said element and said current position is within said predetermined range; and
   means for receiving the coordinates of longitude and latitude of said starting place and said final place, and coordinates of longitude and latitude of said nodes, from an external auxiliary device including a processor for selecting said scheduled route based on the starting place and final place.

2. A navigation method comprising:
   setting a starting place and a final place;
   providing the starting place and final place to an external auxiliary device including a processor;
   selecting at least one scheduled route based on the provided starting place and final place using the processor of the external auxiliary device;
   receiving coordinates in longitude and latitude of the starting place and the final place, and coordinates in longitude and latitude of nodes on said scheduled route, as angular data in units of degrees longitude and degrees latitude through interface means from said external auxiliary device;
   storing coordinates in longitude and latitude of the starting place and the final place, and coordinates in longitude and latitude of nodes on said scheduled route, in the navigation device as angular data in units of degrees longitude and degrees latitude;
   detecting an absolute position in longitude and latitude of the current position of a user by using electric waves coming from a plurality of artificial satellites going around the earth, the absolute position being expressed as angular data in units of degrees longitude and degrees latitude;
   correcting the angular data of said absolute position and said coordinates according to said current position and converting the corrected angular data into distance data, and calculating an element between said nodes;
   calculating whether or not said current position is on said scheduled route based on whether or not the distance between said element and said current position is within a predetermined range;
   displaying said current position and said scheduled route in accordance with the calculation results; and
   controlling a display based on the calculation of whether or not the distance between said element and said current position is within said predetermined range.

3. A navigation method as set forth in claim 2, characterized in that said predetermined range is varied such that it is smaller when said current position is approaching said scheduled route than when said current position is moving away from said scheduled route.

* * * * *